June 23, 1970  R. KLANNER ET AL  3,516,682
CROSS COUNTRY VEHICLES
Filed Dec. 6, 1967  6 Sheets-Sheet 5
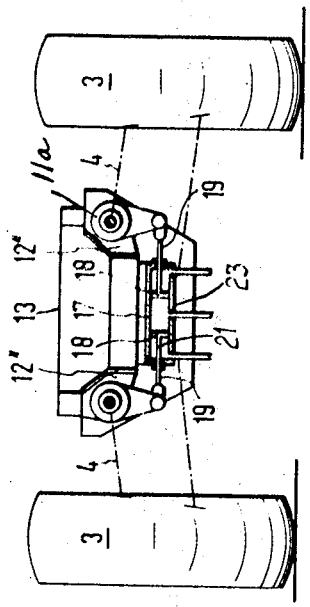
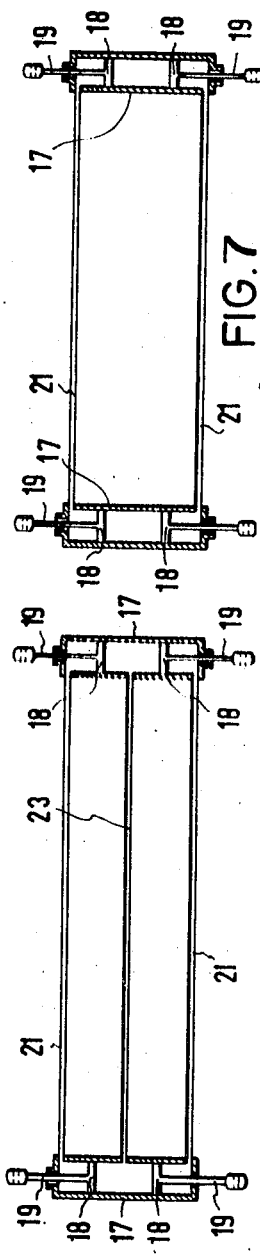

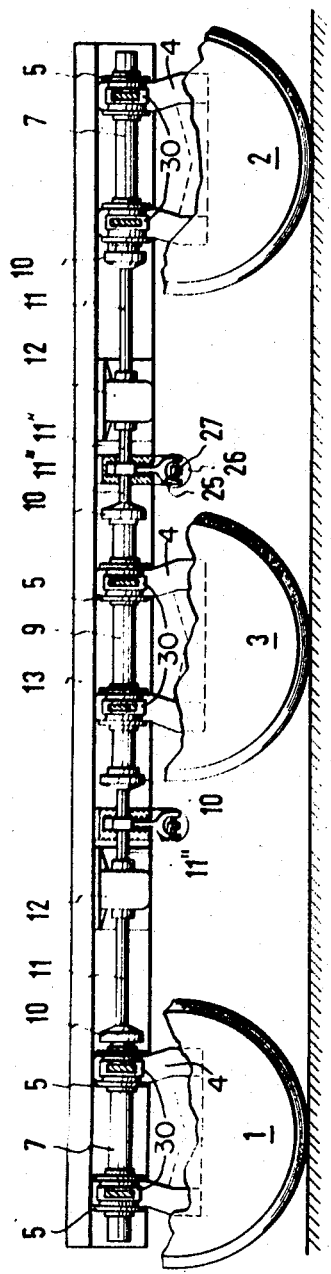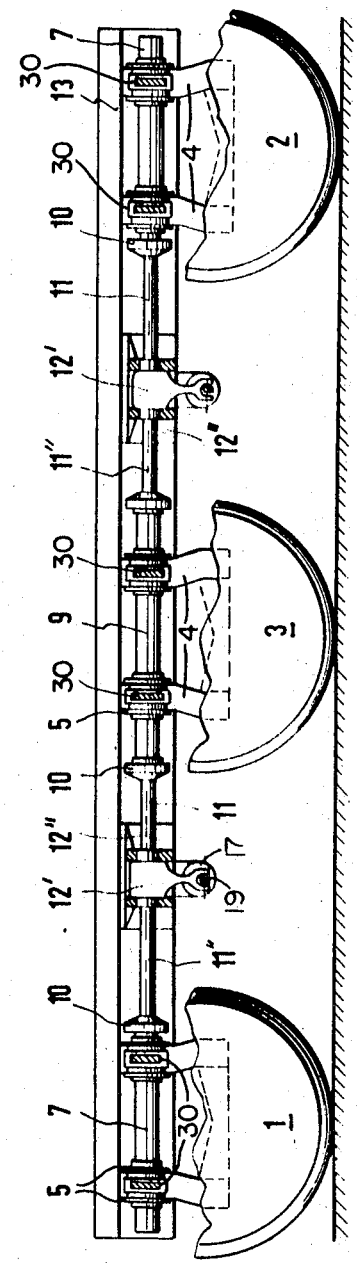

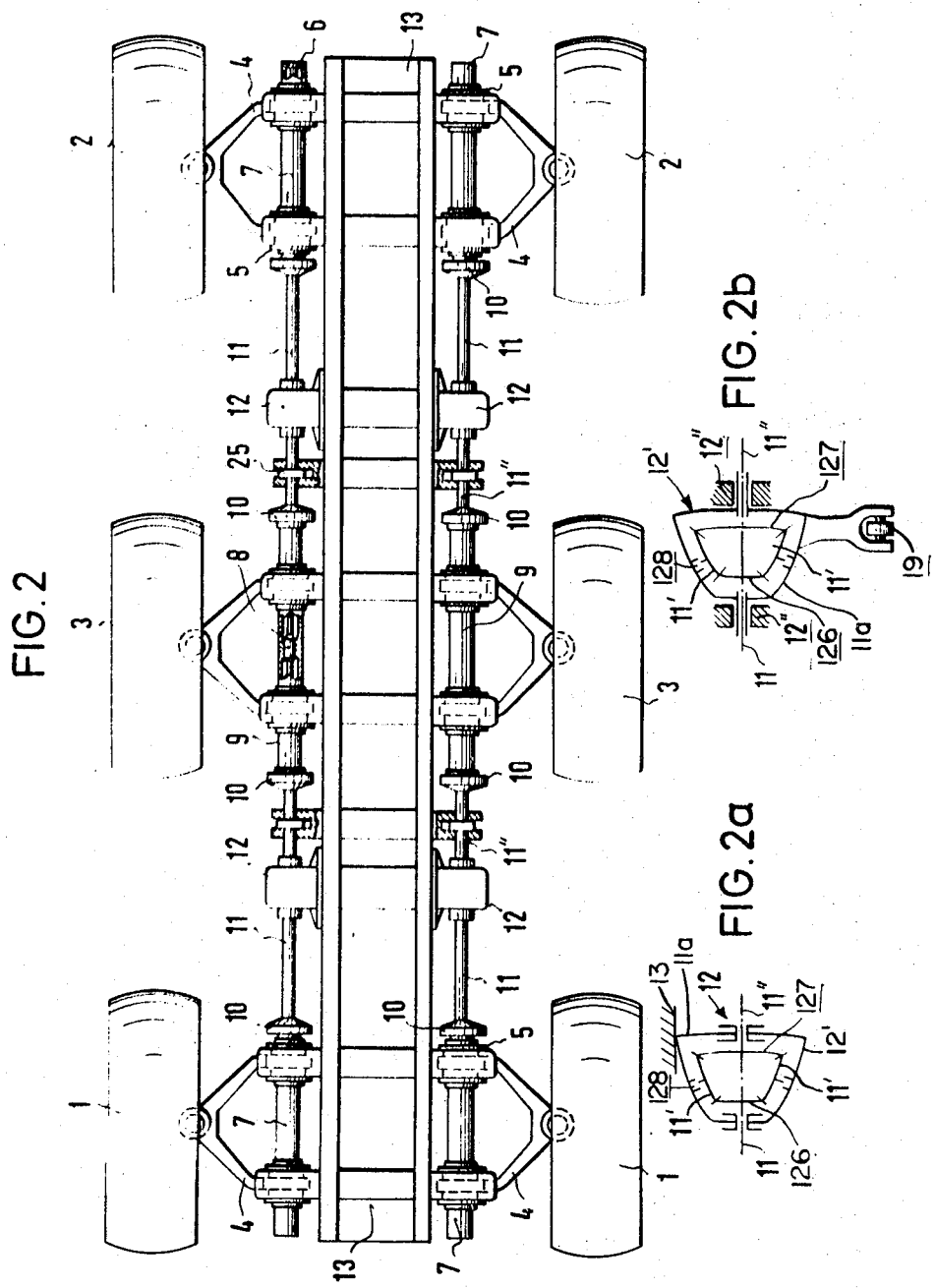

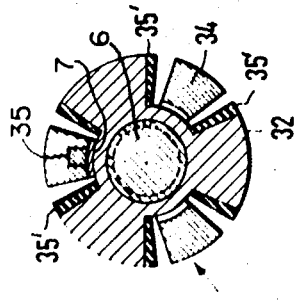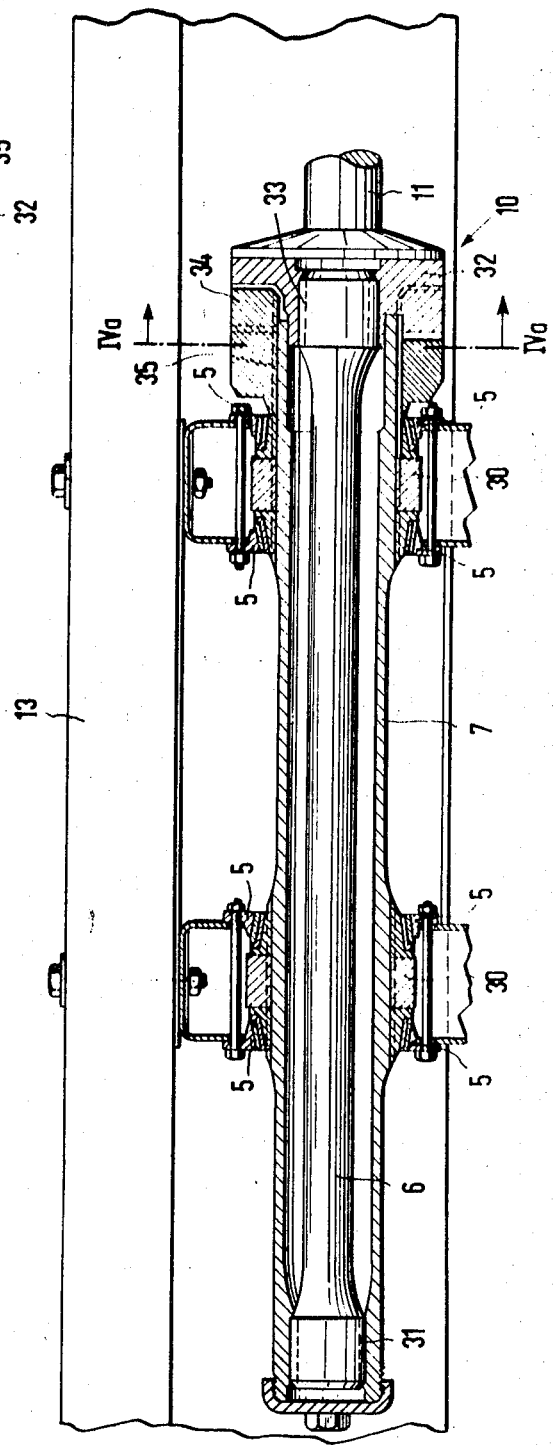

United States Patent Office 3,516,682
Patented June 23, 1970

3,516,682
CROSS COUNTRY VEHICLES
Rudolf Klanner, Munich-Obermenzing, and Josef Merkle, Munich, Germany, assignors to Maschinenfabrik Augsburg-Nuremberg Aktiengesellschaft, Munich, Germany
Continuation-in-part of application Ser. No. 447,642, Apr. 13, 1965. This application Dec. 6, 1967, Ser. No. 688,397
Claim priority, application Germany, Apr. 14, 1964, M 60,643
Int. Cl. B60g 11/18; 19/02; 19/04
U.S. Cl. 280—104.5                                    10 Claims

ABSTRACT OF THE DISCLOSURE

The specification describes various forms of six-wheeled vehicles having each wheel connected with its own torsion rod suspension spring. The springs are connected together by rotation reversing means in such a manner that vertical movement of the center wheel pair produces a downward thrust on the two outer wheel pairs. Conversely, an upward movement of one or both of the outer wheel pairs produces a downward thrust on the center wheel pair.

---

This is a continuation-in-part of abandoned application Ser. No. 447,642, filed Apr. 13, 1965, for "Stabilizer for a Three-Axle Vehicle."

The present invention relates more particularly to cross country wheeled vehicles, that is to say vehicles inherently capable of traversing tracts of uneven terrain.

One object of our invention is to provide such a vehicle which has means coordinating vehicle movements of its wheels so that an improved performance over difficult ground is achieved.

A further object of the present invention is to provide such a vehicle which shows satisfactory stability during cross country operation and does not require the use of stabilizing wheels in addition to three basic pairs of wheels.

The general nature of the invention can be stated to consist in that a six-wheeled vehicle has each wheel connected with its own torsion rod suspension spring and the springs are connected together by rotation reversing means in such a manner, that vertical movement of the center wheel pair produces a downward thrust on the two outer wheel pairs and, conversely, an upward movement of one or both of the outer wheel pairs produces a downward thrust on the center wheel pair.

Further objects of our invention and the constructional features employed to achieve them will be readily gathered from the following description referring to the attached drawings.

FIGS. 1 and 2 are respectively views from the side and from above of a vehicle structure in accordance with the invention.

FIG. 2a is a diagrammatic view of a differential unit as used in the vehicle structure of FIGS. 1 and 2.

FIG. 2b is a view similar to FIG. 2a but showing a modification thereof.

FIG. 3 is a modified view of a unit as used in the vehicle structure of FIG. 1.

FIGS. 4 and 5 are horizontal sections parallel to torsion rod springs of the vehicle structures of FIGS. 1–3.

FIG. 4a is a section on the line IVa—IVa of FIG. 4.

FIG. 6 is a cross section of the vehicle structure of FIG. 3.

FIG. 7 shows hydraulic circuits corresponding to the arrangements of FIGS. 6 and 1.

FIG. 8 shows a further possible hydraulic circuit.

Figure 5:
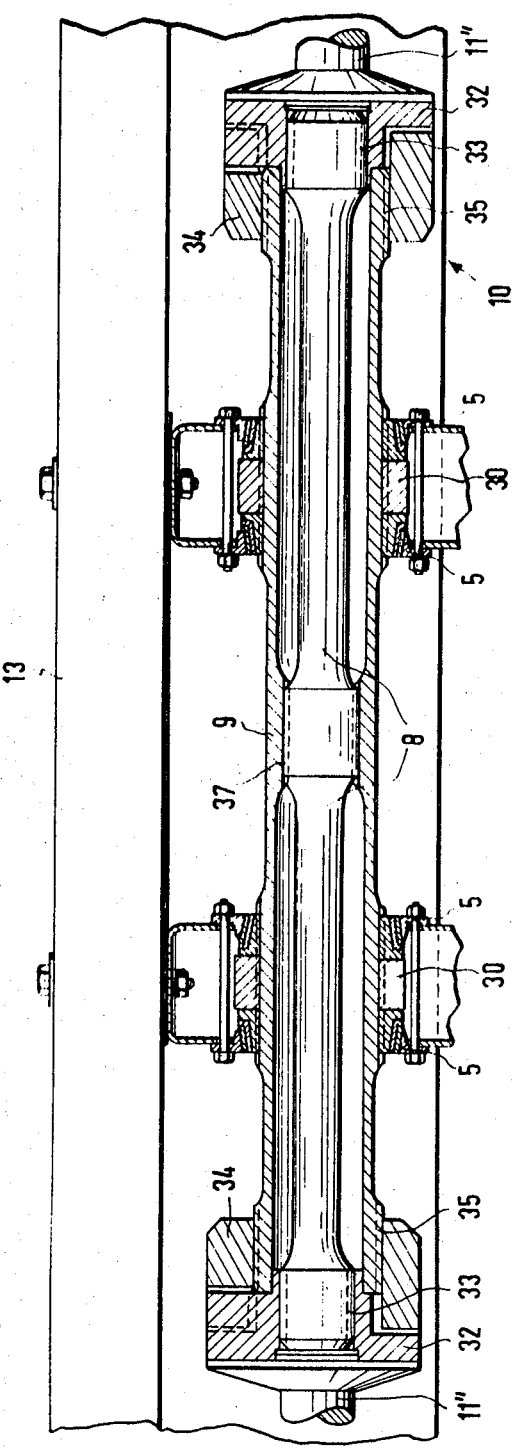

Referring now to the drawings and more particularly to FIGS. 1 and 2 it will be seen that the vehicle in accordance with the invention has a front pair of nearside and offside wheels respectively 1, a middle pair of nearside and offside wheels 3 respectively, and a rear pair of near and offside wheels 2 respectively.

Each wheel is connected with a central chassis 13 by means of two superposed V-shaped swinging arms of which only the upper ones 4 are visible in FIG. 2. Each upper swinging arm has its spread out ends 30 (see FIGS. 1 and 5) firmly connected with a tube 7 or 9 which is mounted by means of bearings 5 on the chassis 13 of the vehicle so that it can rotate about its axis. Each of the tubes 7, are shown in FIG. 4 contains a trosion rod spring 6 and each of the tubes 9 as shown in FIG. 2 contains a torsion rod spring 8.

As will be clear from FIG. 2 the torsion rod springs and their associated tubes are arranged in two coaxial groups at the two sides of the vehicle.

The front ends of the front tubes 7 in each group and the rear ends of the rear tubes 7 in each such group are connected by means of torque transmitting means in the form of wedge-shaped splines generally denoted by reference numeral 31 (see FIG. 4) with the rod springs. The opposite ends of the torsion rod springs 6 are connected with the coupling part 32 of a means 10 for limiting resilient twisting of the torsion rod, the part 32 being connected with the respective torsion rod spring by means of wedge-shaped splines denoted by reference numeral 33. The part 34 of the means 10 for limiting resilient twisting of the torsion rod is connected by means of wedge-shaped splines 35 with the tube 7. As will be apparent from FIGS. 4 and 4a the parts 32 and 34 each have three axially extending interlocking teeth or segments which each allow a certain amount of relative rotation between them corresponding to resilient twisting of the torsion rod spring 6. Resilient abutment pads 35' are provided on the radial faces of the teeth of part 32.

Each of the four parts 32 connected with a shaft 6 is also connected with one end of a shaft 11 of which the other end is connected with a rotation-reversing means in the form of a differential unit 12 as shown diagrammatically in FIG. 2a. Each of the four differential units comprises two bevel gears 126, 127 keyed respectively on the shaft 11 and a further shaft 11″, the two gears being connected by means of idler gear wheels 11′ which are turnable mounted in bearings 128 of a differential frame 11a. The housing 11a is attached to chassis 13.

As shown in FIG. 5 each of the torsion rod springs 8 connected with one of the two middle wheels 3 is connected by means of torque transmitting means 37, in the form of wedge-shaped splines, with the associated surrounding tube 9. At positions axially spaced from this torque transmitting connection, the torsion rod spring 8 is connected at its ends with twist-limiting means of substantially the same construction as that described with reference to FIGS. 4 and 4a. These means, denoted by general reference numeral 10 limit resilient twisting in the two parts of the torsion rod 8 on the two sides of the connection 37. The parts 32 are each connected with the shafts 11″ connected with the differentials 12 as shown in FIG. 2a.

The velocity ratios of the differential units 12 are 1:2 so that the angular movement of the shafts 11″ are twice as great as those of those of the shafts 11 with which they are connected. As a result the movements of the front and rear wheel in a vertical direction, ignoring resilient twisting of the torsion rod springs, are half those of the middle wheels and the middle wheels are always so loaded that they are firmly pressed against the ground. This is of advantage when the vehicle is operating on uneven terrain.

As shown in FIGS. 2b, and 6 the frames 11a for differential units 12' can be arranged in bearings 12" on the chassis 13 so that they are able to turn. The differentials 12' are then connected with piston rods 19 fitted with hydraulic pistons 18 mounted in two common cylinders 17 fixed to the chassis. As shown in FIG. 7, the sides of the pistons 18 facing the differential frames are connected by means of ducts 21 together. In this arrangement it is possible to adjust the ground clearance of the vehicle by altering the amount of hydraulic liquid in the cylinders 17 between the pistons 18. In the case of the construction shown in FIGS. 6 and 7 the frames of the differential units are arranged to turn about the axis of the shafts 11 and 11" as shown in FIG. 2b.

In accordance with the arrangement of FIGS. 6 and 8 a single duct 23 connects the middle part of one cylinder 17, which makes a hydraulic connection between the piston faces, with the corresponding space between the faces of the other pair pistons.

Instead of using rotation reversing means in the form of differential gear units shown in the embodiments of the invention described above it is possible, as shown in FIG. 9, to use hydraulic ones. In this construction the ends of the torsion rods 6 and 8 to be connected for causing opposite rotation are provided with radially extending arms RA which are connected with piston rods 114 and pistons 115. The pistons 115 are arranged in pairs in cylinders 116. For the purpose of the following description of the hydraulic connections between the cylinders, the outer faces of the pistons, that is to say those turned towards the associated torsion rod springs will be referred to as the first faces while the faces turned inwards will be referred to as the second faces.

Figure 9:
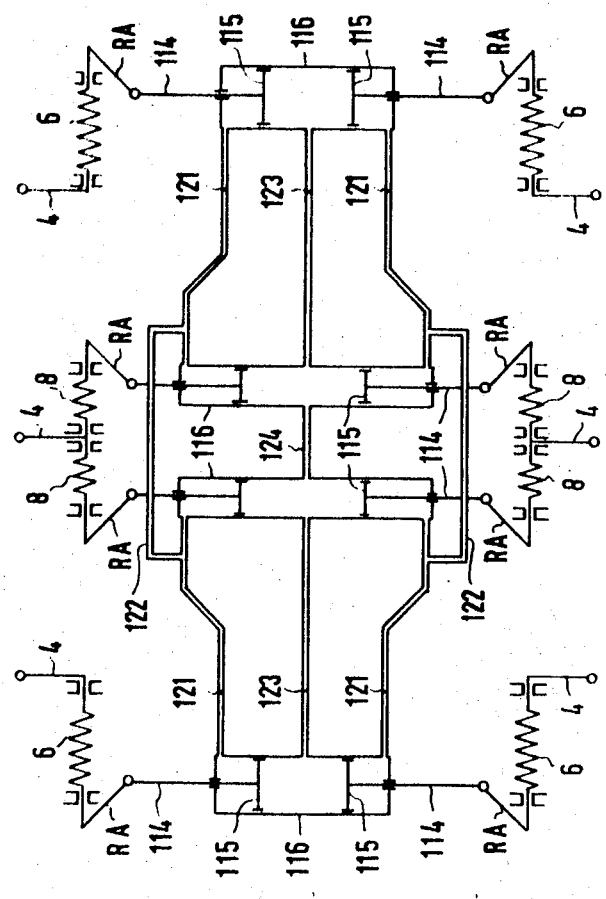
FIG. 9 shows a hydraulic circuit connecting the torsion rod springs in a further embodiment of the invention.

As can be seen from FIG. 9 there are four ducts 121 which connect the first faces of the pistons so as to form four groups. There are also ducts 123 and 124 which connect all the second faces of the pistons together.

Cross sections of the cylinders are so arranged that the velocity ratio between movements of the middle pistons, that is to say the pistons connected with the torsion rod springs 8 and those of the front and rear pistons, that is to say those connected with the torsion rod springs 6 is 2:1.

This arrangement is the hydraulic equivalent of the arrangement shown in FIGS. 3, 6 and 8.

The arrangement of FIG. 9 may be modified by dispensing with the duct 124 so that it is equivalent regarding vertical wheel movements to the mechanical arrangement of FIGS. 3, 6 and 7. Also the ducts 122 may be dispensed with. These ducts 122 always produce the same prevailing pressure in both ducts 121 and the parts of the cylinder 116 connected therewith between the piston 115 and the head of the cylinder. They thus have the same function as ducts 124.

We claim:
1. In a vehicle structure comprising a rigid chassis having three wheels arranged on each side, respectively, of said chassis to form a front wheel, a rear wheel and a middle wheel, each wheel, respectively, being connected to said chassis by arms spread apart adjacent said chassis and an apex end adacent the wheel, each wheel being capable of independent vertical movement with relation to said chassis, the improvement in which two axially aligned torsion bar springs (8) are joined at one end to the arms (4) of the middle wheel (3) and at their other end to rotation reversing means (12), and torsion shaft means (6) joined between said rotation reversing means (12) to the front and rear wheels (1 and 2) for permitting independently sprung movement of said middle wheel.

2. In a structure as in claim 1, said rotation reversing means comprising a differential reversing gear unit (12).

3. In a structure as in claim 2, said gear unit (12) having a housing frame pivotally connected transversely of said frame and containing differential gears, and rod means interconnecting each housing frame with its corresponding housing frame on the opposite side of said chassis.

4. In a structure as in claim 3, said rod means comprising hydraulic piston means (17) attached to said chassis and including connecting rods (19) joined to each housing frame.

5. In a structure as in claim 3, said rod means comprising a cylinder attached to said chassis, two opposing pistons in said cylinder and forming three cylinder spaces, and a connecting rod joining each piston, respectively, to its housing frame.

6. In a structure as in claim 5, further comprising fluid pressure equalizing line means (21) connecting each cylinder with its corresponding cylinder on the opposite side of said chassis.

7. In a structure as in claim 1, said rotation reversing means comprising a hydraulic cylinder (116) joined between said front wheel and its corresponding wheel on the opposite side of said chassis and to said torsion shaft means (6), a similar arrangement for said rear wheel, second hydraulic cylinders (116) joined between the torsion bar spring (8) for the middle wheel (3) and its corresponding middle wheel on the opposite side of said chassis, two pistons (115) in each of said second hydraulic cylinders (116) forming three cylinder spaces in each cylinder, and fluid pressure line means (121) connecting each of said second hydraulic cylinders with the hydraulic cylinders for said front wheel and said rear wheel.

8. In a structure as in claim 7, further comprising a pipe line (122) interconnecting said line means (121).

9. In a structure as in calim 8, further comprising lines (123) interconnecting the middle cylinder spaces of said cylinders (116).

10. In a structure as in claim 9, further comprising a pipe line (124) interconnecting the middle cylinder spaces of the cylinders for said middle wheel.

References Cited

UNITED STATES PATENTS

| | | | |
|---|---|---|---|
| 2,428,160 | 9/1947 | Holmstrom et al. | 267—57 X |
| 2,469,566 | 5/1949 | Low | 280—104.5 |

A. HARRY LEVY, Primary Examiner

U.S. Cl. X.R.

267—57